US012086923B2

(12) United States Patent
Stiebeiner et al.

(10) Patent No.: US 12,086,923 B2
(45) Date of Patent: Sep. 10, 2024

(54) SURFACE DETERMINATION USING THREE-DIMENSIONAL VOXEL DATA

(71) Applicant: FARO Technologies, Inc., Lake Mary, FL (US)

(72) Inventors: Ariane Stiebeiner, Stuttgart (DE); Georgios Balatzis, Fellbach (DE); Festim Xhohaj, Nürtingen (DE); Antonin Klopp-Tosser, Ivry-sur-Seine (FR)

(73) Assignee: FARO Technologies, Inc., Lake Mary, FL (US)

( * ) Notice: Subject to any disclaimer, the term of this patent is extended or adjusted under 35 U.S.C. 154(b) by 219 days.

(21) Appl. No.: 17/723,676

(22) Filed: Apr. 19, 2022

(65) Prior Publication Data

US 2022/0358709 A1 Nov. 10, 2022

Related U.S. Application Data

(60) Provisional application No. 63/184,558, filed on May 5, 2021.

(51) Int. Cl.
*G06T 15/08* (2011.01)
*G01N 23/046* (2018.01)
(Continued)

(52) U.S. Cl.
CPC ............ *G06T 15/08* (2013.01); *G01N 23/046* (2013.01); *G01N 23/083* (2013.01);
(Continued)

(58) Field of Classification Search
CPC ....... G06T 15/08; G06T 11/008; G06T 15/50; G06T 17/20; G06T 2200/08;
(Continued)

(56) References Cited

U.S. PATENT DOCUMENTS 4,835,712 A * 5/1989 Drebin ................... G06T 17/00
345/426
5,900,880 A * 5/1999 Cline ..................... G06T 17/00
345/423
(Continued)

FOREIGN PATENT DOCUMENTS

EP 1861822 B1 7/2011

OTHER PUBLICATIONS

Kezhou Wang, T. S. Denney, E. E. Morrison and V. J. Vodyanoy, "Construction of Volume Meshes from Computed Tomography Data," 2005 IEEE Engineering in Medicine and Biology 27th Annual Conference, Shanghai, China, 2005, pp. 5168-5171, doi: 10.1109/IEMBS.2005.1615641. (Year: 2005).*

(Continued)

*Primary Examiner* — William A Beutel
(74) *Attorney, Agent, or Firm* — McCarter & English, LLP; Dave S. Christensen

(57) ABSTRACT

Examples described herein provide a method that includes obtaining, by a processing device, three-dimensional (3D) voxel data. The method further includes performing, by the processing device, gray value thresholding based at least in part on the 3D voxel data and assigning a classification value to at least one voxel of the 3D voxel data. The method further includes defining, by the processing device, segments based on the classification value. The method further includes filtering, by the processing device, the segments based on the classification value. The method further includes evaluating, by the processing device, the segments to identify a surface voxel per segment. The method further includes determining, by the processing device, a position of a surface point within the surface voxel.

24 Claims, 11 Drawing Sheets

(51) Int. Cl.
  *G01N 23/083* (2018.01)
  *G06T 11/00* (2006.01)
  *G06T 15/50* (2011.01)
  *G06T 17/20* (2006.01)

(52) U.S. Cl.
  CPC ............ *G06T 11/008* (2013.01); *G06T 15/50* (2013.01); *G06T 17/20* (2013.01); *G01N 2223/04* (2013.01); *G01N 2223/401* (2013.01); *G01N 2223/419* (2013.01); *G06T 2200/08* (2013.01); *G06T 2211/40* (2013.01)

(58) Field of Classification Search
  CPC ............ G06T 2211/40; G06T 2200/04; G06T 2207/10081; G06T 7/11; G06T 7/12; G06T 7/136; G01N 23/046; G01N 23/083; G01N 2223/04; G01N 2223/401; G01N 2223/419
  See application file for complete search history.

(56) References Cited

U.S. PATENT DOCUMENTS

| | | | |
|---|---|---|---|
| 8,045,806 B2 | 10/2011 | Lettenbauer et al. | |
| 2010/0291505 A1* | 11/2010 | Rawley | A61C 5/77 700/98 |
| 2015/0279084 A1* | 10/2015 | Deuerling-Zheng | G06T 5/50 345/424 |
| 2022/0068039 A1* | 3/2022 | Roberts | A61B 6/463 |

OTHER PUBLICATIONS

Heinzl et al.; "Robust Surface Detection for Variance Comparison and Dimensional Measurement"; Eurographics/IEEE-VGTC Symposium on Visualization; The Eurographics Association; 2006; 8 Pages.

* cited by examiner

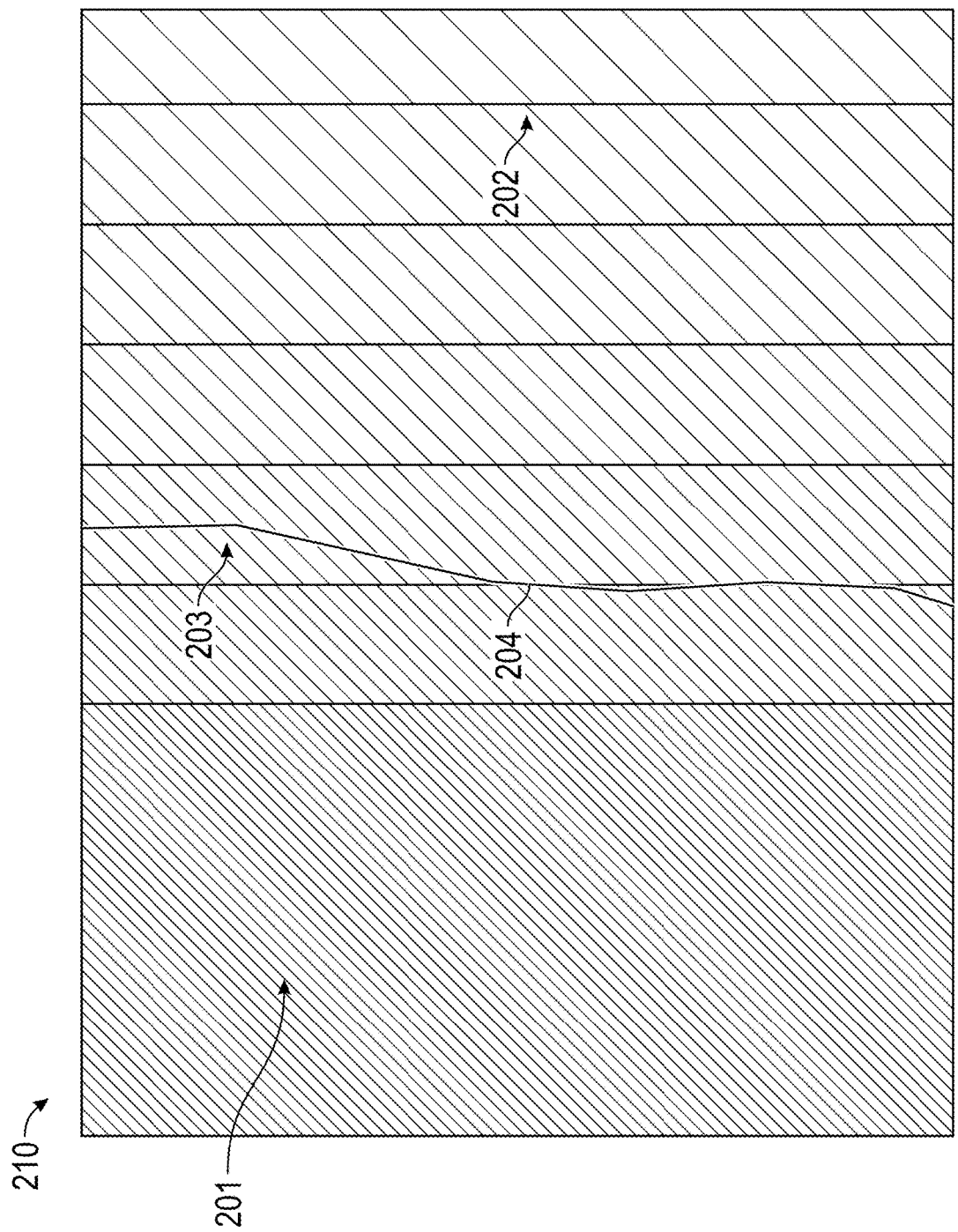

SURFACE DETERMINATION USING THREE-DIMENSIONAL VOXEL DATA

CROSS REFERENCE TO RELATED APPLICATIONS

This application claims the benefit of U.S. Provisional Patent Application No. 63/184,558 filed May 5, 2021, the disclosure of which is incorporated herein by reference in its entirety.

BACKGROUND

The subject matter disclosed herein relates to a computed tomography (CT) system and methods for inspecting objects, and in particular to a system and methods for surface determination using three-dimensional (3D) voxel data.

CT systems provide a non-invasive means for inspecting objects. A CT system emits x-rays that pass into and through an object. The measurement of these x-rays allows the generation of two-dimensional (2D) x-ray images of the object. In some systems, the objects are rotated in the scanner and imaged hundreds of times. These 2D images are combined into a three-dimensional (3D) voxel (volumetric pixel) data set. From this voxel data set, a surface can be extracted and stored as a 3D point cloud. The 3D point cloud may be used to measure the object being inspected.

Accordingly, while existing CT inspection systems are suitable for their intended purposes, the need for improvement remains, particularly in providing a CT inspection system and method having the features described herein.

SUMMARY

According to one or more examples, a method is provided. The method includes obtaining, by a processing device, three-dimensional (3D) voxel data. The method further includes performing, by the processing device, gray value thresholding based at least in part on the 3D voxel data and assigning a classification value to at least one voxel of the 3D voxel data. The method further includes defining, by the processing device, segments based on the classification value. The method further includes filtering, by the processing device, the segments based on the classification value. The method further includes evaluating, by the processing device, the segments to identify a surface voxel per segment. The method further includes determining, by the processing device, a position of a surface point within the surface voxel.

In addition to one or more of the features described above or below, or as an alternative, obtaining the 3D voxel data includes: importing the 3D voxel data.

In addition to one or more of the features described above or below, or as an alternative, further embodiments may include that obtaining the 3D voxel data includes: creating, by a computed tomography (CT) system, two-dimensional (2D) x-ray projection images; and constructing, by the CT system, the 3D voxel data based at least in part on the 2D x-ray projection images.

In addition to one or more of the features described above or below, or as an alternative, further embodiments may include smoothing or masking the 3D voxel data subsequent to obtaining the 3D voxel data.

In addition to one or more of the features described above or below, or as an alternative, further embodiments may include performing a gradient thresholding subsequent to defining the segments.

In addition to one or more of the features described above or below, or as an alternative, further embodiments may include that the gradient thresholding includes: calculating a gray value gradient and a gradient magnitude for each voxel with a particular classification value; generating a gradient magnitude histogram of gradient magnitudes; identifying peaks in the gradient magnitude; identifying a threshold relative to one of the peaks; and untagging any voxels having a gradient magnitude less than the threshold.

In addition to one or more of the features described above or below, or as an alternative, further embodiments may include performing a gradient thresholding subsequent to evaluating the segments.

In addition to one or more of the features described above or below, or as an alternative, further embodiments may include that the gradient thresholding includes: calculating a gray value gradient and a gradient magnitude for each voxel with a particular classification value; generating a gradient magnitude histogram of gradient magnitudes; identifying peaks in the gradient magnitude; identifying a threshold relative to one of the peaks; and untagging any voxels having a gradient magnitude less than the threshold.

In addition to one or more of the features described above or below, or as an alternative, further embodiments may include meshing surface points from multiple segments to generate a mesh representation.

In addition to one or more of the features described above or below, or as an alternative, further embodiments may include that performing the gray value thresholding includes: generating a gray value histogram for the 3D voxel data; identifying peaks in the gray value histogram; identifying a first threshold and a second threshold; and tagging voxels based at least in part on a gray value associated with each of the voxels.

In addition to one or more of the features described above or below, or as an alternative, further embodiments may include that identifying the peaks includes identifying a first peak corresponding to a background gray value and identifying a second peak corresponding to a material gray value.

In addition to one or more of the features described above or below, or as an alternative, further embodiments may include that identifying the peaks includes identifying a first peak corresponding to a background gray value, identifying a second peak corresponding to a first material gray value of a first material, and identifying a third peak corresponding to a second material gray value of a second material.

In addition to one or more of the features described above or below, or as an alternative, further embodiments may include that identifying the peaks is based at least in part on a first derivative and a second derivative of a curve.

In addition to one or more of the features described above or below, or as an alternative, further embodiments may include that identifying the first threshold is based on a first knee point associated with the first threshold, and therein identifying the second threshold is based on a second knee point associated with the second threshold.

In addition to one or more of the features described above or below, or as an alternative, further embodiments may include that the first threshold is greater than the first peak, and wherein the second threshold is less than the second peak.

In addition to one or more of the features described above or below, or as an alternative, further embodiments may include that a first subset of voxels having a gray value less than the first threshold are tagged with a value of "0", wherein a second subset of voxels having a gray value greater than the first threshold and less than the second threshold are tagged with a value of "1", and wherein a third subset of voxels having a gray value greater than the second threshold are tagged with a value of "2".

In addition to one or more of the features described above or below, or as an alternative, further embodiments may include that the segments are a sequence of voxels tagged with the value of "1" in any one of an x-dimension, y-dimension, or z-dimension with at least one voxel tagged with the value of "1".

In addition to one or more of the features described above or below, or as an alternative, further embodiments may include that determining the position of the surface point within the surface voxel includes: calculating a background percentage of voxel volume; and calculating a material percentage of voxel volume.

In addition to one or more of the features described above or below, or as an alternative, further embodiments may include extracting a distance from a database for a given gray value and a gradient direction of the surface voxel; locating the surface point on a first plane using the distance from the database relative to a corner of the surface voxel; generating a second plane through the surface point using a gradient vector; and sampling the second plane to refine a location of the surface point based at least in part on point cloud density.

According to one or more examples, a method is provided. The method includes performing, by a computed tomography (CT) system, a CT scan of an object to generate two-dimensional (2D) x-ray projection images. The method further includes performing, by a processing system, CT reconstruction to generate three-dimensional (3D) voxel data from the 2D x-ray projection images. The method further includes smoothing or masking, by the processing system, 3D voxel data. The method further includes performing, by the processing system, gray value thresholding based at least in part on the 3D voxel data and assigning a classification value to at least one voxel of the 3D voxel data. The method further includes defining, by the processing system, segments based on the classification value. The method further includes filtering, by the processing system, the segments based on the classification value. The method further includes performing, by the processing system, a first gradient thresholding. The method further includes evaluating, by the processing system, the segments to identify a surface voxel per segment. The method further includes performing, by the processing system, a second gradient thresholding. The method further includes determining, by the processing system, a position of a surface point within the surface voxel. The method further includes meshing, by the processing system, surface points from multiple segments to generate a mesh representation.

In addition to one or more of the features described above or below, or as an alternative, further embodiments may include that performing the CT scan includes: emitting, by an x-ray source, x-rays towards the object; capturing, by a detector, the x-rays, wherein at least one of the x-rays passes through the object prior to being captured; and generating, based at least in part on the captured x-rays, the 2D x-ray projection images.

In addition to one or more of the features described above or below, or as an alternative, further embodiments may include that performing the first gradient thresholding includes: calculating a gray value gradient and a gradient magnitude for each voxel with a particular classification value; generating a gradient magnitude histogram of gradient magnitudes; identifying peaks in the gradient magnitude; identifying a threshold relative to one of the peaks; and untagging any voxels having a gradient magnitude less than the threshold.

In addition to one or more of the features described above or below, or as an alternative, further embodiments may include that performing the second gradient thresholding includes: calculating a gray value gradient and a gradient magnitude for each voxel with a particular classification value; generating a gradient magnitude histogram of gradient magnitudes; identifying peaks in the gradient magnitude; identifying a threshold relative to one of the peaks; and untagging any voxels having a gradient magnitude less than the threshold.

In addition to one or more of the features described above or below, or as an alternative, further embodiments may include that performing the gray value thresholding includes: generating a gray value histogram for the 3D voxel data; identifying peaks in the gray value histogram; identifying a first threshold and a second threshold; and tagging voxels based at least in part on a gray value associated with each of the voxels.

BRIEF DESCRIPTION OF THE DRAWINGS

The subject matter, which is regarded as the invention, is particularly pointed out and distinctly claimed in the claims at the conclusion of the specification. The foregoing and other features, and advantages of embodiments of the invention are apparent from the following detailed description taken in conjunction with the accompanying drawings in which:

FIG. 2B depicts a portion of the 2D slice of FIG. 2A;

The detailed description explains embodiments of the disclosure, together with advantages and features, by way of example with reference to the drawings.

DETAILED DESCRIPTION

Embodiments of the present disclosure provide for a computed tomography (CT) system for surface determination using three-dimensional (3D) voxel data.

Figure 1:
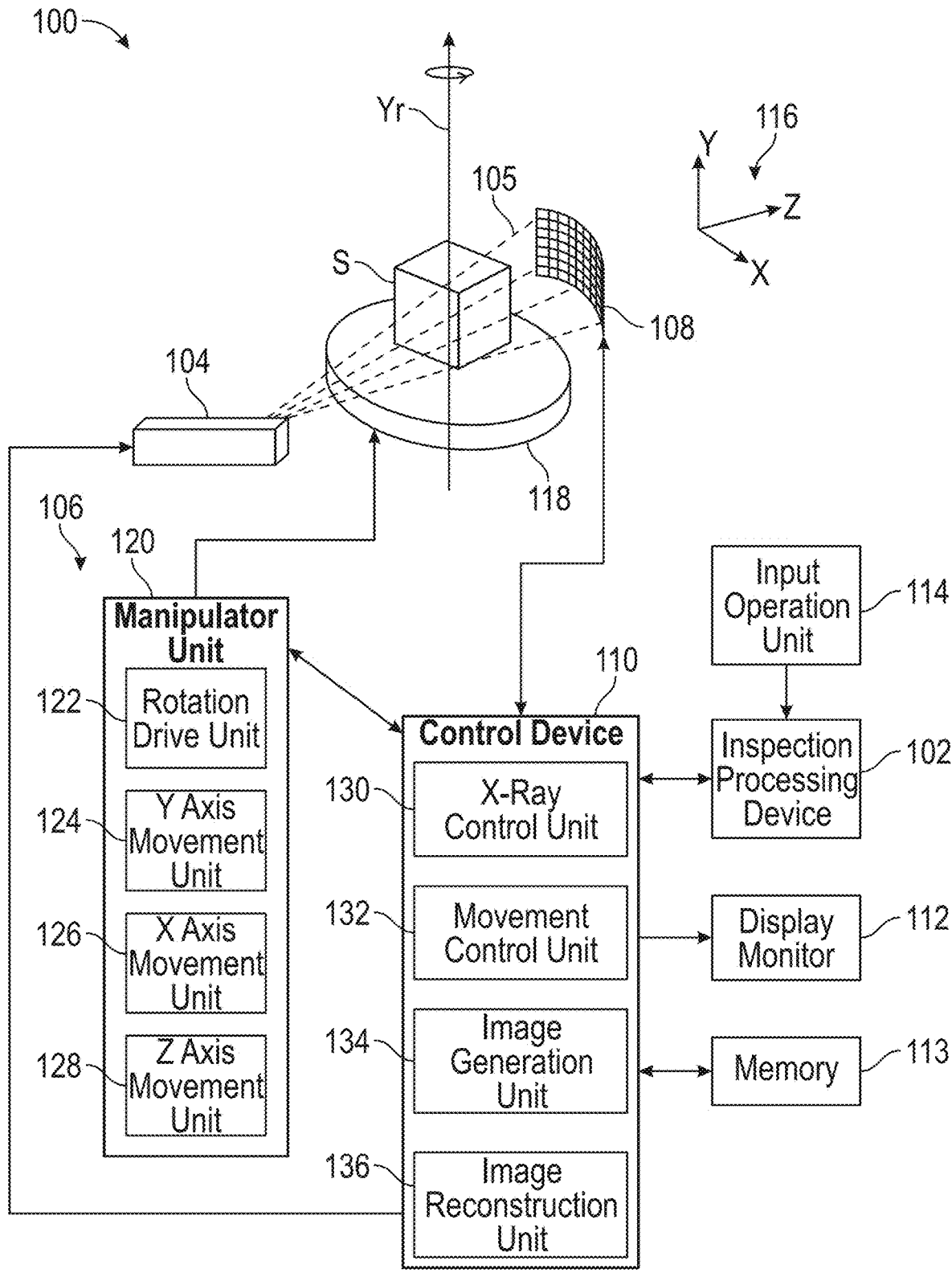
FIG. 1 depicts a schematic diagram of a computed tomography (CT) inspection system according to one or more embodiments described herein.

Referring now to FIG. 1, an embodiment of a CT system 100 for inspecting objects (or "specimen"), such as the specimen S of FIG. 1. It should be appreciated that while embodiments herein may illustrate or describe a particular type of CT system, this is for example purposes and the claims should not be so limited. In other embodiments, other types of CT systems having another trajectory, detector shape, or beam geometry, such as a fan-type or a cone-type CT system, for example, may also be used. The CT system 100 includes an inspection processing device 102, an x-ray source 104, a placement unit 106, a detector 108, a control device 110, a display 112, a memory 113 for storing computer-readable instructions and/or data, and an input operation unit 114. In an embodiment, the x-ray source 104 emits x-rays in a cone shape 105 in the Z direction in the coordinate frame of reference 116 along an optical axis from an emission point in accordance with control by the control device 110. The emission point corresponds to the focal point of the x-ray source 104. That is, the optical axis connects the emission point, which is the focal point of the x-ray source 104, with the center of the imaging capture region of the detector 108. It should be appreciated that the x-ray source 104, instead of one emitting x-rays in a cone shape, can also be one emitting x-rays in a fan-shape for example.

The placement unit 106 is provided with a placement stage 118 on which the specimen S is placed, and a manipulator unit 120. In an embodiment, the manipulator unit 120 includes a rotation drive unit 122, an Y-axis movement unit 124, an X-axis movement unit 126, and a Z-axis movement unit 128. The placement stage 118 or the x-ray source 104 and detector 108 may be configured to be rotatable by the rotation drive unit 122.

The rotation drive unit 122 is, for example, configured by an electric motor or the like, is parallel to the Y-axis, and rotates the x-ray source 104 and detector 108 with an axis passing through the center of the placement stage 118. In an embodiment, the rotation drive unit 122 may be configured to rotate the placement stage 118, such as by an electronic motor, for example, about an axis passing through the center of the placement stage 118. The Y-axis movement unit 124, the X-axis movement unit 126, and the Z-axis movement unit 128 are controlled by the control device 110. In examples, the rotation drive unit 122 is also controlled by the control device 110. The movement of the placement stage in the X-axis direction, the Y-axis direction, and the Z-axis direction are controlled by the control device 110 such that the specimen S is positioned in the emission range of the x-rays emitted by the x-ray source 104 and in the field of view of the detector 108. In an embodiment, the Z-axis movement unit 128 is controlled by the control device 110, and moves the placement stage 118 in the Z-axis direction so that the distance from the x-ray source 104 to the specimen S is a distance wherein the specimen S in the captured image is at the desired magnification ratio.

The detector 108 is provided on an opposite side of the placement stage 118 from the x-ray source 104. In an embodiment, the detector 108 is an area sensor, which has an incident surface extending along the XY plane. X-rays that pass through the specimen S on the placement stage 118 emitted from the x-ray source 104 are incident upon the incident surface of the detector 108. The detector 108 may include a scintillator unit, a photomultiplier tube, a light receiving unit, and the like as is known in the art. The scintillator unit converts the energy of the x-rays to light energy, such as visible light or ultraviolet light, amplifies it with the photomultiplier tube, converts the amplified light energy to electrical energy with the light receiving unit, and outputs it as an electrical signal to the control device 110.

It should be appreciated that the detector 108 described herein is for example purposes and other suitable type of detectors as is known in the art may be used. In other embodiments, for example, the detector 108 may be a one-dimensional line detector.

The x-ray source 104, the placement stage 118, and the detector 108 are supported by a frame (not shown). The frame is constructed having sufficient rigidity. Thus, it is possible to stably support the x-ray source 104, the placement stage 118, and detector 108 while acquiring a projected image of the specimen S. In an embodiment, the frame is supported by an anti-vibration mechanism (not shown) to prevent vibration generated on the outside from being transmitted to the frame.

The inspection processing device 102 receives an input from the input operation unit 114, which is configured by an input device (e.g. keyboard, various buttons, a mouse) and is used by the operator to control the operation of the CT system 100. The inspection processing device 102 causes the control device 110 to implement actions indicated by the input received by the input operation unit 114. The control device 110 is a microprocessor-based system that controls different modules of the CT system 100. The control device 110 includes an x-ray control unit 130, a movement control unit 132, an image generation unit 134, and an image reconstruction unit 136. The x-ray control unit 130 controls the operation of the x-ray source 104. The movement control unit 132 controls the movement of the manipulator unit 120. The image generation unit 134 generates x-ray projected image data for the specimen S based on an output signal from detector 108. The image reconstruction unit 136 performs image reconstruction processing that creates a reconstructed image based on the projector image data for specimen S from each different projection direction as is known in the art.

The reconstructed image is an image illustrating the structure of the interior and exterior of the specimen S that is positioned in between the x-ray source 104 and the detector 108. In an embodiment, the reconstructed image is output as voxel data (also referred to as "CT voxel data"). The voxel data is an absorption coefficient distribution of the specimen S. According to one or more embodiments described herein, the CT system 100 can be a fan-type or a cone-type CT system. In an embodiment, back projection, filtered back projection, and iterative reconstruction may be used in image reconstruction processing.

Metrology is the science of measurement. In order to use industrial x-ray CT for performing metrology tasks, such as dimensional measurements, a surface model needs to be extracted from 3D voxel data. For example, in order to perform metrology analyses on voxel data created by CT scanning (such as using the CT system 100), a surface needs to be determined from the voxel data. That is, surface points need to be identified from 3D voxel data captured by the CT system 100 where information is stored as 16-bit gray values for each voxel. The gray value represents the absorption capabilities for x-ray radiation of a volume in a particular position. For single-material data sets, there are typically two specific gray values, namely one for the material and one for the background surrounding the material. Due to the finite resolution of the CT scans, voxels at the interface between background and material can have a gray value between the gray value for the background and the gray value for the material. The gray value of the voxels at the interface between background and material can vary depending on the percentage of the volume of the voxel that belongs to material. The interface between background and material is located at the position of highest gray value change.

Figure 2A:
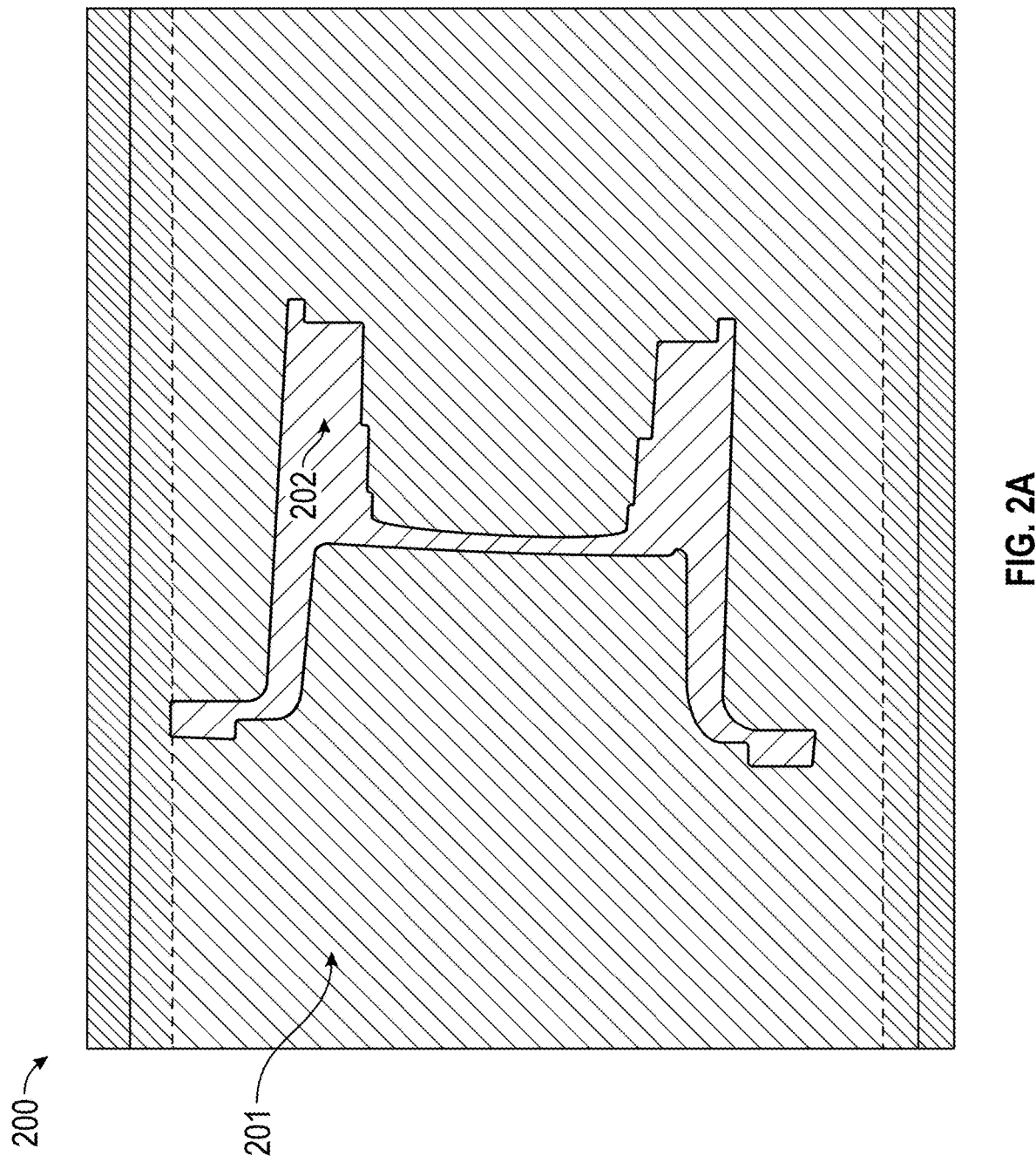
FIG. 2A depicts a 2D slice of a single material three-dimensional CT data set.

There are several conventional approaches typically used for finding the surface of an object from a voxel data set. Most of these approaches rely on the evaluation of either gray values of the voxels or gray value gradients, or both. On an ideal voxel data set, these conventional approaches work well enough. However, artifacts caused by the reconstruction of voxel data from 2D projection images and noise can alter the gray values and the gray value gradients locally such that conventional approaches are insufficient. Therefore, for CT voxel data that is affected by reconstruction artifacts and/or noise, no reliable, metrology-grade surface determination can be performed. This limits the application of CT scanning for metrology tasks and typically requires the use of more expensive and complex hardware to overcome the effect caused by artifacts. Turning now to FIGS. 2A and 2B, FIG. 2A depicts a 2D slice 200 of a single material 3D CT data set. As shown, the 2D slice 200 includes a background 201 and a material 202. FIG. 2B depicts a portion 210 of the 2D slice 200 including the background 201 and the material 202. The portion 210 represents a zoomed-in area of the 2D slice 200 As can be seen in FIG. 2B, the 2D slice 200 is made up of individual voxels, and each of the voxels has a gray value as can be seen. In this example, the background 201 has voxels with gray values "b" and the material 202 has voxels with gray values "m". A surface voxel 203 is shown that has a gray value "s" that is between "b" and "m" (i.e., "b" <"s" <"m"). The surface voxel 203 represents a voxel through which a surface 204 passes.

It can be difficult to distinguish surface voxels from background voxels or material voxels when, for example, the gray value of a surface voxel is similar to the gray value of a background voxel or a material voxel. It can also be difficult to distinguish surface voxels from noise that may be present in the 3D voxel data because the noise may cause the gray values of background voxels and material voxels to vary over a significant range. For example, in CT systems with cone-beam x-ray sources, the quality of the datasets is affected by the specimen's material, its geometry, the penetration lengths of the beams, and the positioning of the specimen. Hence, CT systems are prone to artifacts like noise-induced streaks, aliasing, beam-hardening, partial volume, or scattered radiation effects. These complicate the extraction of an accurate surface model and make surface determination difficult and imprecise.

Conventional approaches to addressing these problems with surface determination include global thresholding and local thresholding. Global thresholding creates a histogram of gray values to identify gray values for background and material from peaks. To do this, the value is calculated using an ISO50 threshold approach, which calculates an ISO50 value by averaging the gray value for background and material accordingly. Then, 3D linear interpolation is used between voxel centers to find all points with a gray value equal to the ISO50 value. This approach is imprecise because it only uses the average value, which is susceptible to outlier bias and does not consider local variations.

Another conventional approach to addressing these problems with surface determination is local thresholding, which creates a starting contour from global thresholding as described. For each point on the starting contour, a profile line is created in the gradient direction and a sample gray value profile is created along the profile line. This is done using linear interpolation between voxels. On each profile line, a point of strongest slope is identified, and a position of the surface point can be refined by using a local ISO50 value similar to global thresholding. Although this approach provides local variations consideration that global thresholding does not, the location of the resulting surface point strongly depends on the starting contour position and search distance (length of profile line). Therefore, local thresholding can be inaccurate if a poor starting contour position and/or search distance are used.

To address these and other deficiencies of the prior art, one or more embodiments described herein perform surface determination using 3D voxel data, such as data from a CT scan. This approach improves conventional surface determination techniques by improving the accuracy and precision of surface location determination. According to one or more embodiments described herein, surface determination is performed by using gray value thresholding to tag voxels as possibly representing a surface, defining segments of sequences of voxels tagged as possibly representing a surface, evaluating the segments to identify one surface voxel per segment, and using the identified one surface voxel per segment to determine the location of a surface (represented as a plane) within each surface voxel.

The one or more embodiments described herein provide numerous technical advantages over the prior art as described. Further, the embodiments of the present invention facilitate improvements to computing technology, and particularly to techniques used for scanning an object using CT scanners and then evaluating the scanned data to identify surfaces. For example, a CT system is disclosed that determines surface points of a surface from 3D voxel data obtained from a CT scanner. One or more embodiments described herein filter out voxels of the 3D voxel data that are noise, merely close to a surface without containing the surface, or otherwise not voxels containing the surface. Further, one or more embodiments described herein are automated in that user/expert interaction is reduced or eliminated, thus providing a user independent approach. As described herein, local thresholding can be inaccurate if a poor segment starting contour position and/or search distance are used. The present techniques improve existing CT systems by providing an automated approach that reduces/eliminates human error regarding selecting a starting contour and search distance. By removing the voxels that do not contain the surface, surface determination is improved. More particularly, surfaces can be determined with much higher accuracies and confidence levels. This improves computing technology and further represents a practical application that facilitates object evaluation, traceability of measurements, and measurements when performing metrology CT techniques.

Figure 3:
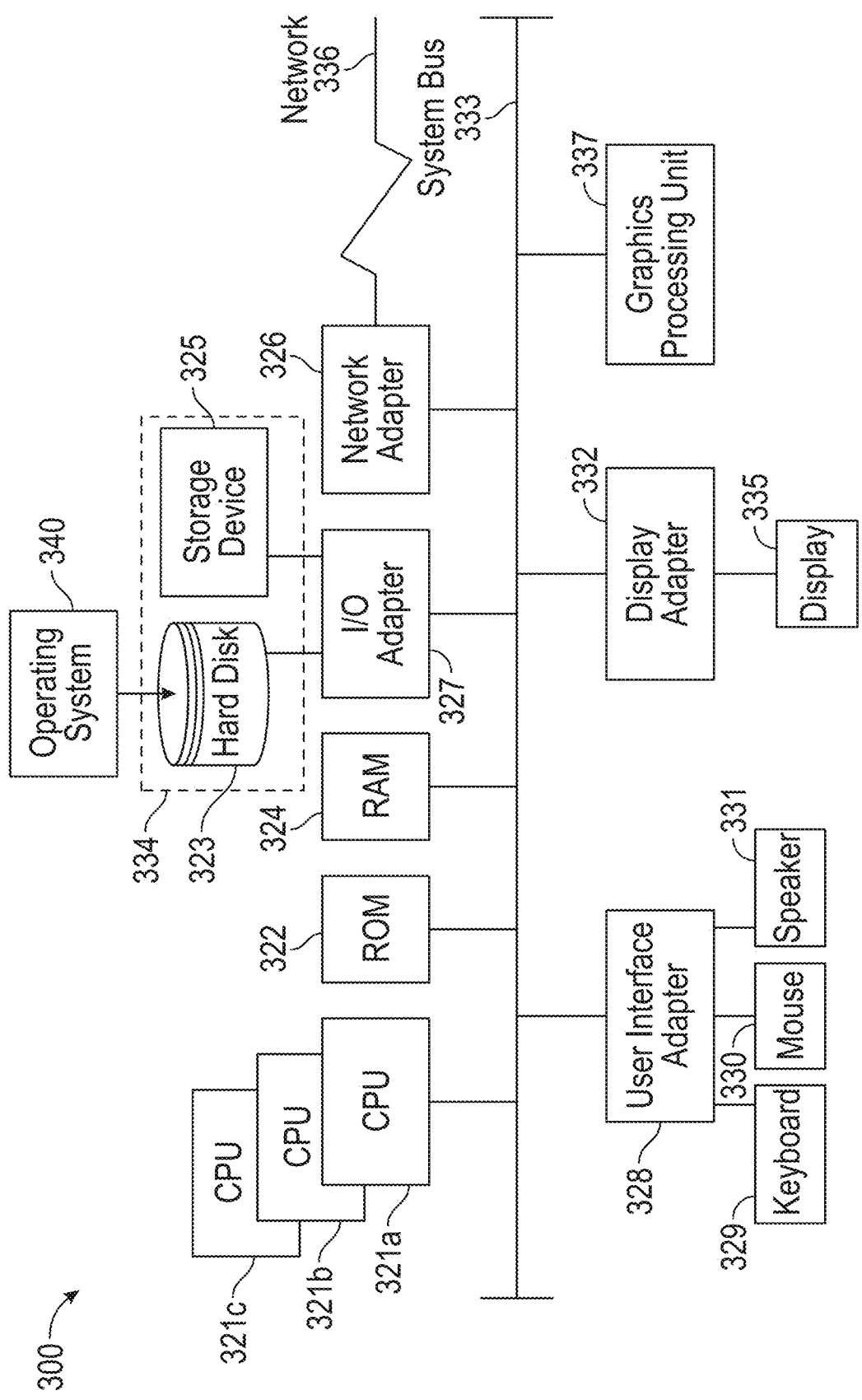
FIG. 3 depicts a computing device for performing the techniques according to one or more embodiments described herein.

It is understood that one or more embodiments described herein are capable of being implemented in conjunction with any other type of computing environment now known or later developed. For example, FIG. 3 depicts a block diagram of a processing system 300 for implementing the techniques described herein. In examples, one or more embodiments described herein can be implemented in a cloud computing environment having one or more cloud computing nodes, and the processing system 300 is an example of a cloud computing node. In examples, processing system 300 has one or more central processing units ("processors" or "processing resources") 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a storage device 325 or any other similar component. I/O adapter 327, hard disk 323, and storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adapter 332, which may include a graphics adapter to improve the performance of graphics intensive applications and a video controller. In one aspect of the present disclosure, adapters 326, 327, and/or 332 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store the operating system 340 to coordinate the functions of the various components shown in processing system 300.

Figure 4:
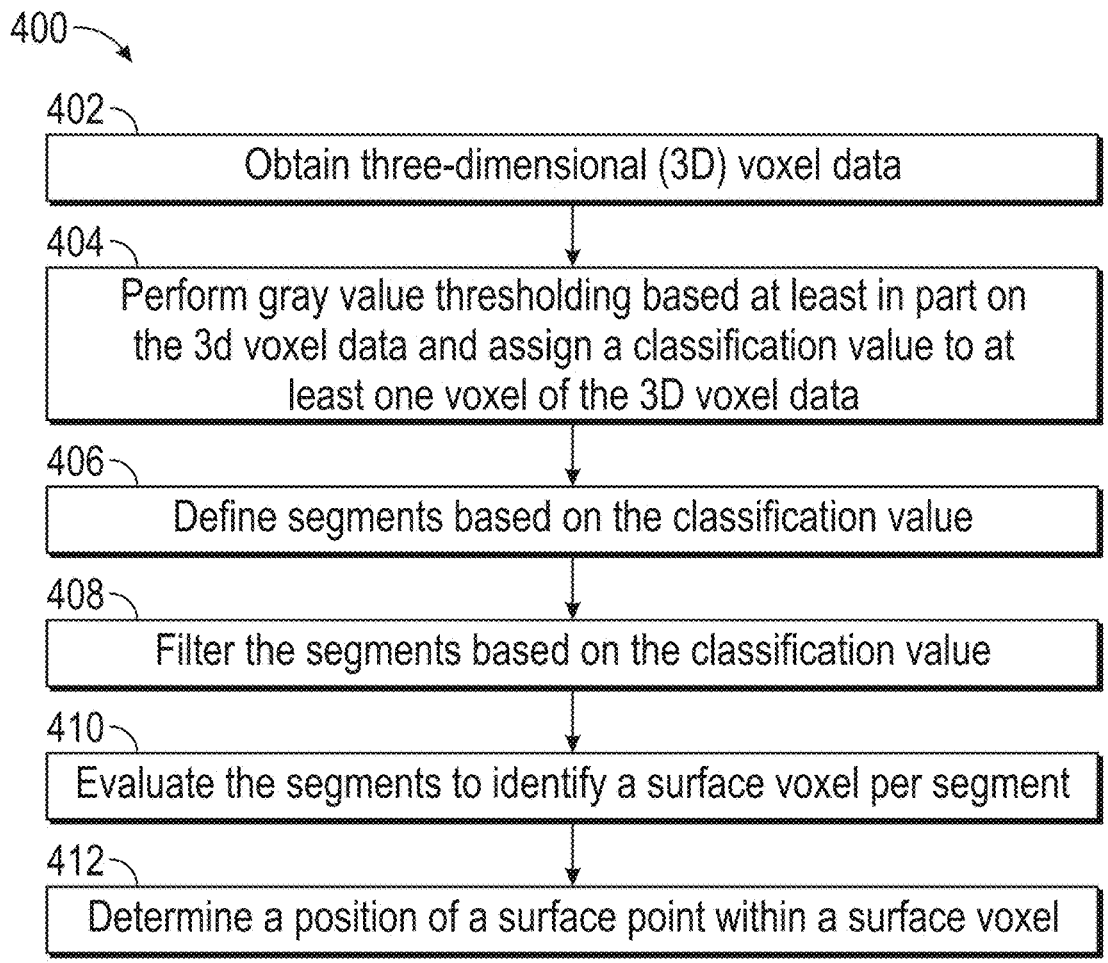
FIG. 4 depicts a flow diagram of a method for surface determination using 3D voxel data according to one or more embodiments described herein.

FIG. 4 depicts a flow diagram of a method 400 for surface determination using 3D voxel data according to one or more embodiments described herein. The method 400 can be performed by any suitable processing system or device, such as the control device 110, the processing system 300, the processors 321, etc. The method 400 is now described as if performed by the CT system 100 and the processing system 300, with reference also to FIGS. 5, 6, 7, 8, 9, 10A, and 10B, but is not so limited.

At block 402, 3D voxel data of a sample/object is obtained. Obtaining the 3D voxel data can occur in different ways. As one example, the 3D voxel data is imported, such as from a database or other data store. As another example, the 3D voxel data is generated by scanning the sample/object using a CT system (e.g., the CT system 100). In this example, the CT system creates 2D x-ray projection images of the sample/object and then constructs the 3D voxel data using the 3D x-ray projection images. In some examples, the 3D voxel data is smoothed and/or masked prior to being obtained. For example, denoising can be used to create a mask to cut out an object from a noisy background rather than using denoised data to create the surface.

At block 404, the processing system 300 performs gray value thresholding based at least in part on the 3D voxel data. Gray value thresholding is now described with reference to FIGS. 5 and 6. Particularly, FIG. 5 depicts a flow diagram of a method 500 for performing gray value thresholding according to one or more embodiments described herein.

Figure 6:
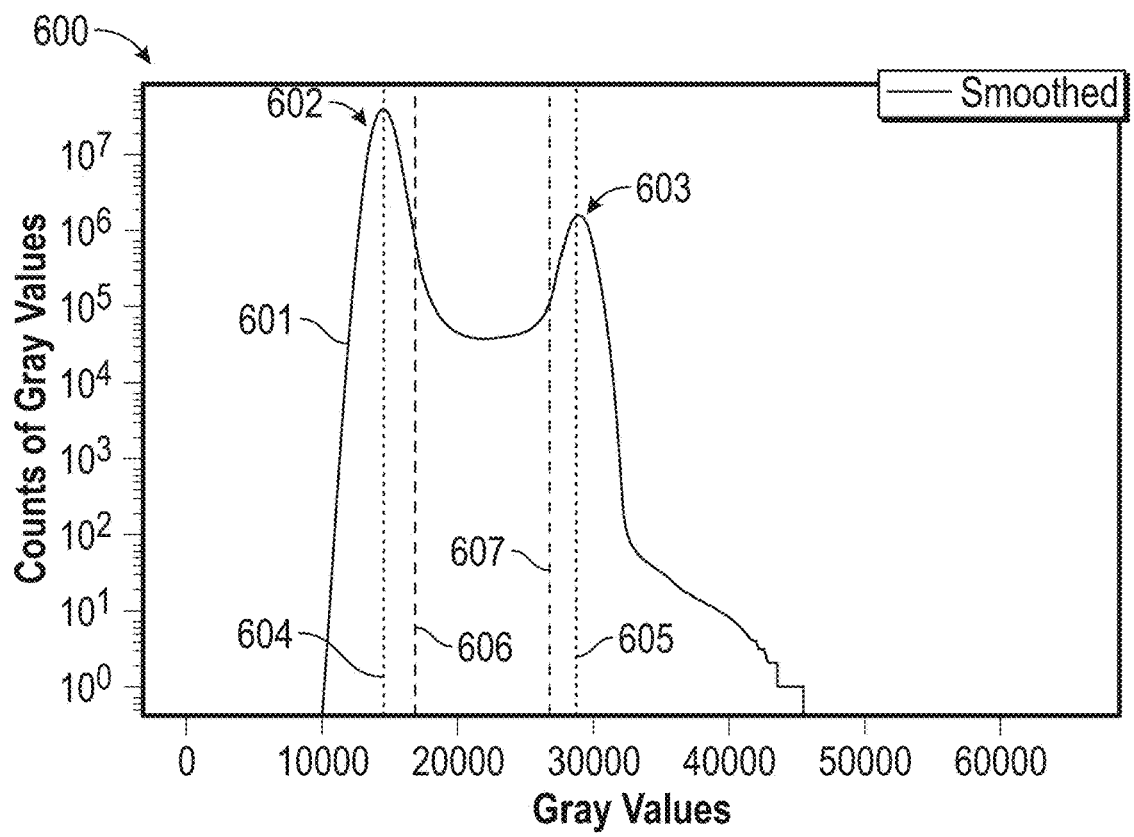
FIG. 6 depicts an example gray value histogram according to one or more embodiments described herein.

At block 502, the processing system 300 generates a gray value histogram for the 3D voxel data. FIG. 6 depicts an example gray value histogram 600 according to one or more embodiments described herein. It should be appreciated that the gray value histogram 600 is one example of a gray value histogram and other examples are also possible. The gray value histogram 600 plots gray values (x-axis) against counts of gray values (y-axis), as shown by the curve 601. That is, the curve 601 represents a count of gray values for a particular gray value.

Figure 5:
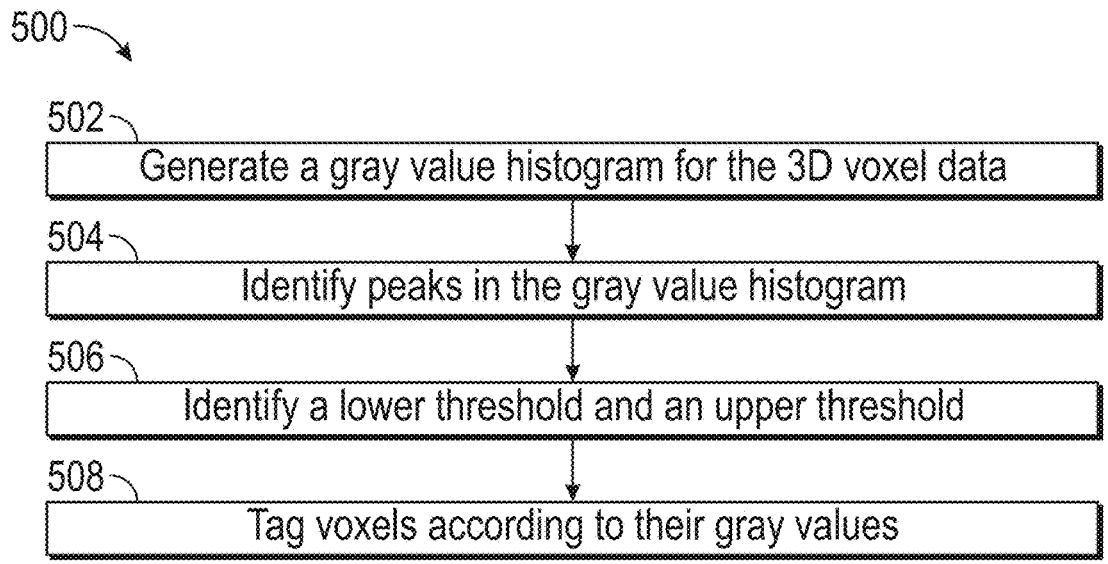
FIG. 5 depicts a flow diagram of a method for performing gray value thresholding according to one or more embodiments described herein.

With continued reference to FIG. 5, at block 504, the processing system 300 identifies peaks in the gray value histogram. For a 3D voxel data set created from a single-material object, the gray value histogram 600 exhibits two distinct peaks: a background gray value peak and material gray value peak. For example, as shown in FIG. 6, the curve 601 of FIG. 6 includes two peaks: a first (background) gray value peak 602 and a second (material) gray value peak 603. The width of each of the peaks 602, 603 is due to noise of the 3D data (which can be seen in the 2D slice 200 of FIG. 2). Surface voxels typically have gray values between these two peaks 602, 603, while voxels falling outside these peaks (i.e., to the left of peak 602 and to the right of peak 603) are not typically surface voxels. The peaks 602, 603 correspond to local maxima 604, 605 of the curve 601 and can be determined using derivatives (e.g., first derivative, second derivative, etc.) of the curve 601.

Once the peaks 602, 603 are identified, thresholds can be identified. For example, at block 506 of FIG. 5, the processing system 300 identifies a lower (first) threshold 606 and an upper (second) threshold 607, which can be used to filter out non-surface voxels. The thresholds 606, 607 are set based on knee points of the peaks 602, 603. The knee points of the peaks 602, 603 represent a point of maximum curvature, which is a mathematical measure of how much a function differs from a straight line. The knee points are shown in FIG. 6 as thresholds 606, 607. The knee points can be determined, for example, using the "kneedle algorithm."

A mathematical definition of curvature for continuous functions is defined using the following equation: for any continuous function f, there exists a standard closed-form Kf(x) that defines the curvature of the continuous function f, at any point as a function of its first and second derivative:

$$K_f(x) = \frac{f''(x)}{\left(1 + f'(x)^2\right)^{1.5}}.$$

With continued reference to FIG. 5, once the thresholds 606, 607 are identified, at block 508, the processing system 300 tags (i.e., classifies) voxels according to their gray values. That is, voxels are tagged (i.e., classified) based on a gray value associated with each of the voxels and assigned a classification value. For example, voxels having a gray value less than (<) the lower threshold (i.e., the threshold 606) are tagged as being background, denoted by a classification value "0." Voxels having a gray value greater than (>) the upper threshold (i.e., the threshold 607) are tagged as being material, denoted by a classification value "2." Voxels having a gray value between the lower threshold and the upper threshold are candidates for the surface (i.e., material boundary) and are denoted with the classification value "1."

Figure 7:
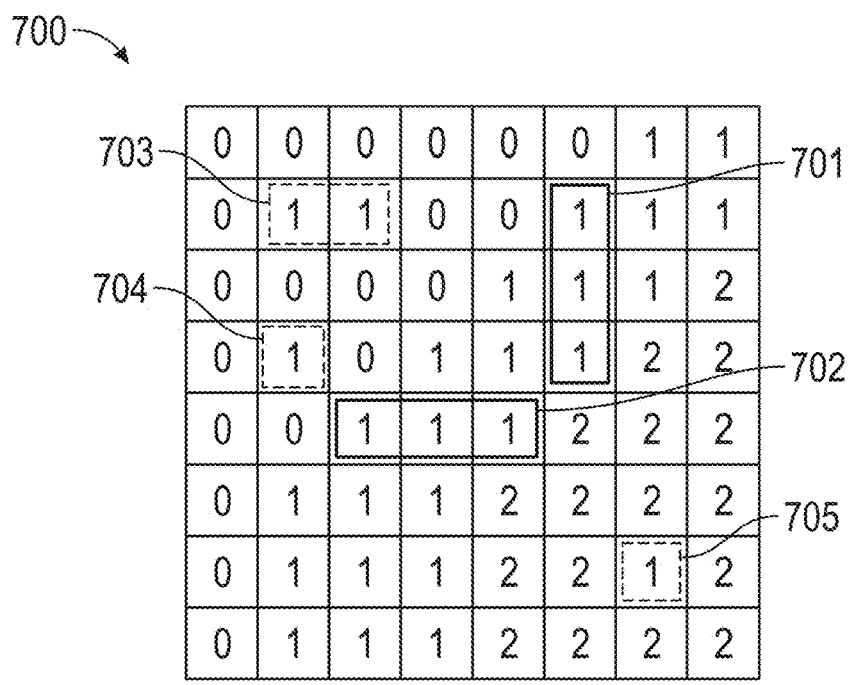
FIG. 7 depicts an example portion of an example slice of a 3D CT volume according to one or more embodiments described herein.

Returning to the discussion of FIG. 4, at block 406, the processing system 300 defines segments based on the classification value from block 508 of FIG. 5. Segments are sequences of voxels tagged with a classification value of "1" in any dimension of the 3D array (x, y, z) with at least one voxel tagged with a classification value of "1." An example is shown in FIG. 7, which depicts an example portion 700 of a slice of a CT volume according to one or more embodiments described herein.

At block 408, the processing system 300 filters the segments based on the classification value. In the example of FIG. 7, five sequences 701, 702, 703, 704, 705 are shown (bold solid lines and bold dashed lines) in the slice 700, although more sequences are present. Valid segments (shown in bold solid lines) are those segments having adjacent voxels going from a classification value of "0" (background) to a classification value of "2" (material) or vice-versa. As can be seen, each of the voxels in the sequence 701 has a classification value of "1" and go from a classification value of "0" (background) in the voxel above the segment 701 to a classification value of "2" (material) in the voxel below the segment 701. Thus, the segment 701 is a valid segment. However, segments going from a classification value of "0" background) to a classification value "0" (background) or segments going from a classification value of "2" (material) to a classification value of "2" (material) are invalid. For example, three invalid sequences 703, 704, 705 are shown (bold dashed lines). In the case of the invalid sequence 705 as an example, each voxel surrounding the segment 705 has a classification value of "2" (material) and thus the segment 705 does not represent a valid segment.

Figure 8:
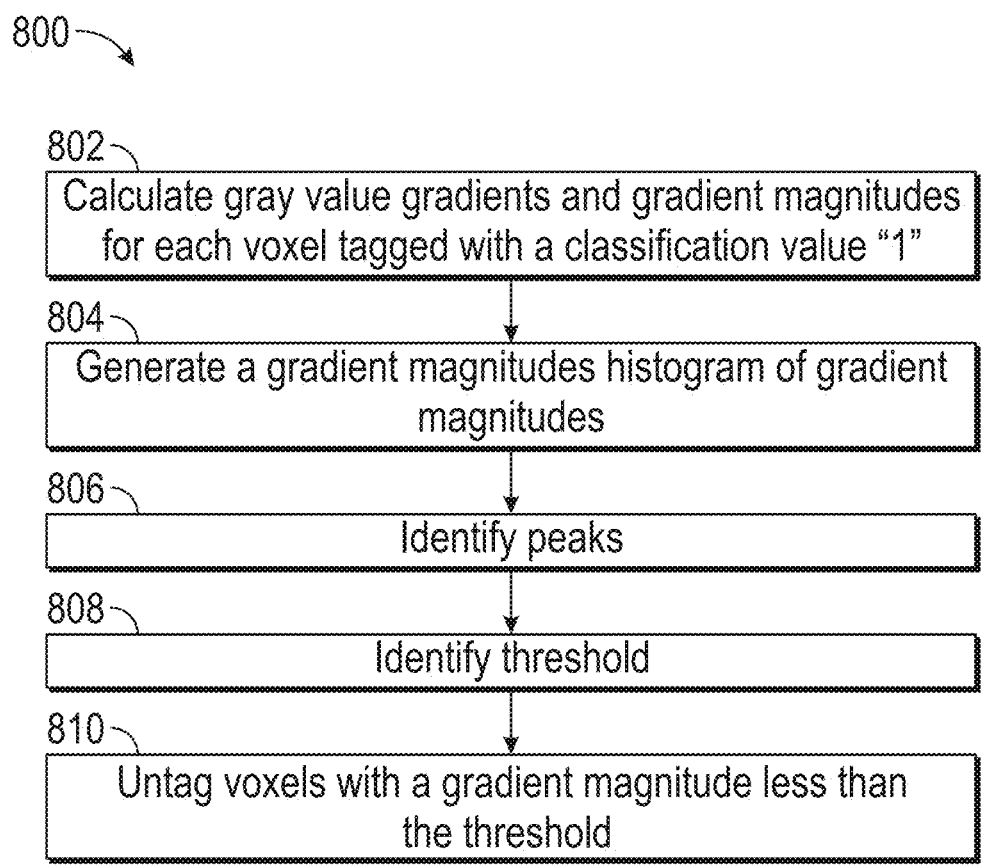
FIG. 8 depicts a flow diagram of a method for performing gradient thresholding according to one or more embodiments described herein.

According to one or more embodiments described herein, the method 400 can include performing gradient thresholding subsequent to defining the segments at block 406 and filtering the segments at block 408. As an example, FIG. 8 depicts a flow diagram of a method 800 for performing gradient thresholding according to one or more embodiments described herein. At block 802, the processing system 300 calculates a gray value gradient and gradient voxels for each voxel in the valid segments. One example of calculating the gradient magnitude of a voxel is as follows:

For each voxel "i" at grid position $(x_i, y_i, z_i)$, with gray value expressed as $GV(x_i, y_i, z_i)$, the gradient components are calculated using the following equations:

$$g_x = (GV(x_i+1, y_i, z_i) - GV(x_i-1, y_i, z_i))/2$$

$$g_y = (GV(x_i, y_i+1, z_i) - GV(x_i, y_i-1, z_i))/2$$

$$g_z = (GV(x_i, y_i, z_i+1) - GV(x_i, y_i, z_i-1))/2$$

where GV is the gray value, $g_x$ is the gradient component in the x-direction, $g_y$ is the gradient component in the y-direction, $g_z$ is the gradient component in the z-direction.

The gradient magnitude is then calculated based on the gradient components using the following equation:

$$\text{Gradient magnitude} = (g_x^2 + g_y^2 + g_z^2)^{1/2}.$$

It should be appreciated that other ways to calculate the gradient exist and the approach described herein is one possible embodiment.

Figure 9:
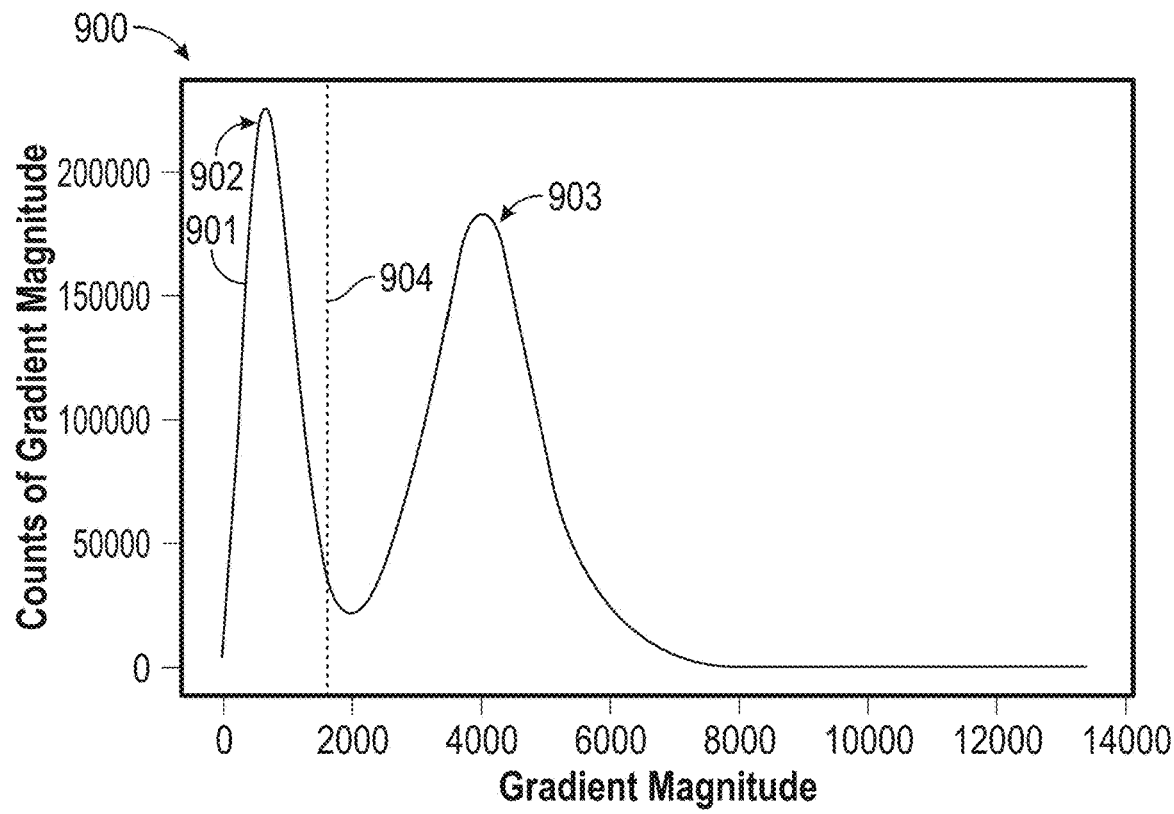
FIG. 9 depicts an example gradient magnitude histogram according to one or more embodiments described herein.
Figure 10A:
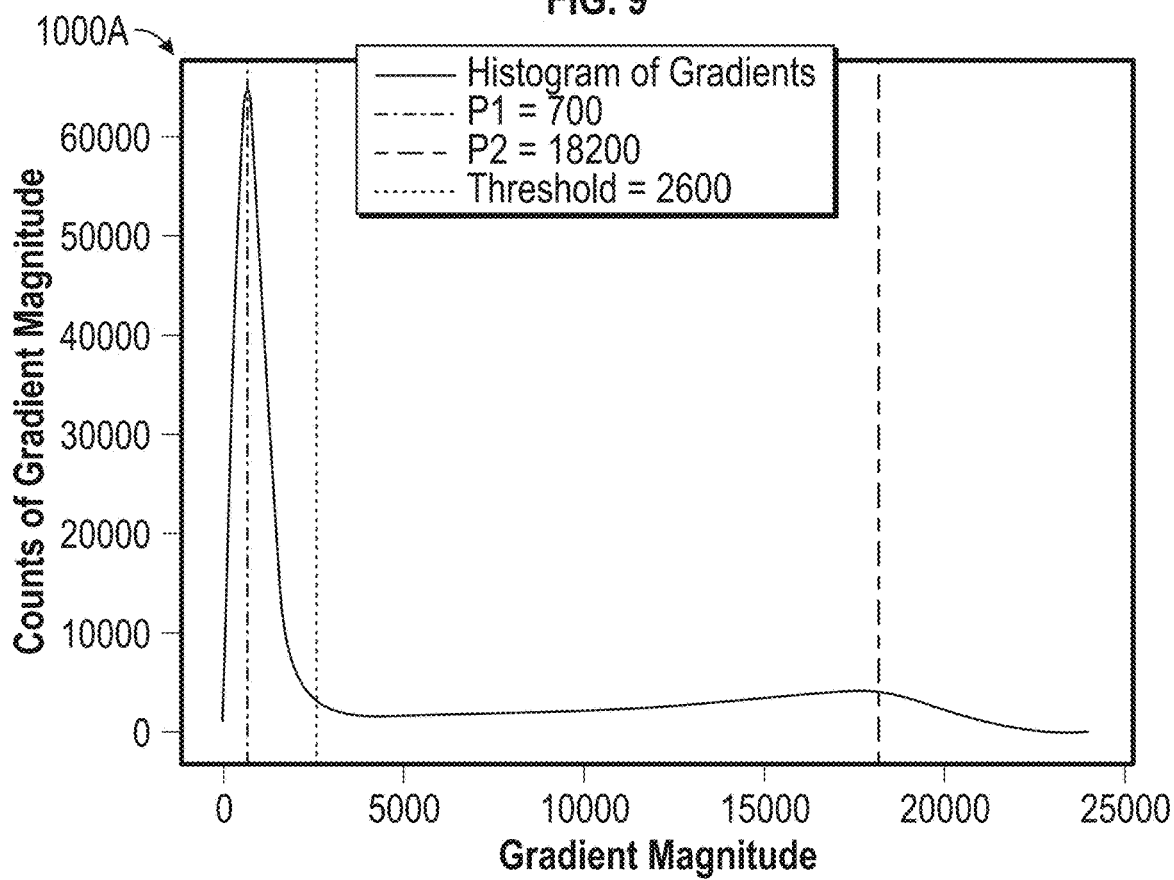
FIGS. 10A and 10B depict example gradient magnitude histograms according to one or more embodiments described herein.
Figure 10B:
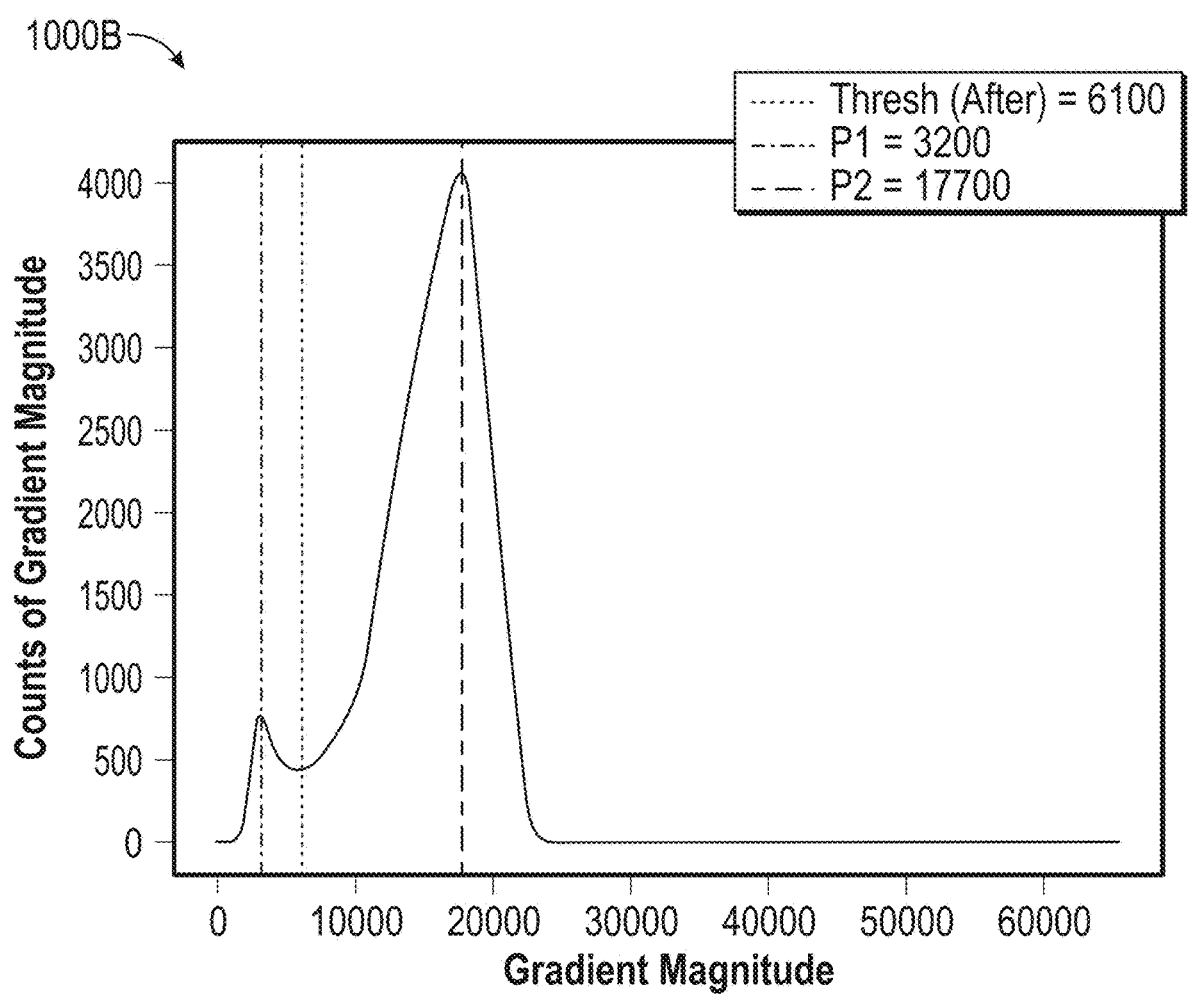

At block 804, the processing system 300 generates a gradient magnitude histogram of the gradient magnitudes. According to an example, a gradient magnitude histogram 900 is depicted in FIG. 9. The gradient magnitude histogram 900 plots a curve 901 of counts of gradient magnitude versus gradient magnitude. It should be appreciated that not all voxels with gray values between the lower (first) threshold 606 and the upper (second) threshold 607 from the gray value thresholding (see FIG. 6) have to be surface voxels. For example, some of these voxels can be noise or voxels close to the surface. It is anticipated that surface voxels are the voxels with the highest gradient magnitude.

As shown, the gradient magnitude histogram 900 exhibits two distinct peaks 902, 903. At block 806, the processing system 300 identifies the peaks 902, 903. For example, as described above with reference to FIG. 6, the peaks 902, 903 can be determined using derivatives (e.g., first derivative, second derivative, etc.) of the curve 901.

At block 808, the processing system identifies a threshold 904. The threshold 904 is used to filter out lower gradient magnitudes (i.e., gradient magnitudes below the threshold 904). According to an example, the threshold 904 is identified using a right knee approach (as described herein) with respect to the peak 902. According to another example, the threshold 904 is identified using a minimum between the peaks 902 and 903. Once the threshold 904 is identified, the gradient magnitudes for each tagged voxel are compared to the threshold. Any tagged voxels having a gradient magnitude less than the threshold are untagged because these voxels are not considered to include the surface (e.g., such voxels are noise, are near a surface voxel, etc.). In an example, any segment containing only untagged voxels after the gradient thresholding are dropped while any segments with at least one voxel that is still tagged are kept for evaluation at block 410.

With continued reference to the method 400 of FIG. 4, at block 410, the processing system 300 evaluates the segments to identify a surface voxel per segment. For example, segments determined to be valid during the filter at block 408 are then evaluated. It is expected that each segment going from background to material or vice versa crosses the surface of the object in exactly one voxel. This is referred to as the surface voxel. The surface voxel is assumed to be the voxel within the segment with the highest gradient magnitude within the segment. The gradient magnitudes are calculated for each voxel as described herein.

Once the gradient magnitude is calculated for the voxels, the surface voxel can be defined for each segment based on the gradient magnitude for each voxel within the respective segment. By iterating through the segments in each dimension (x, y, z), one surface voxel per segment can be identified. Like this, crossing segments can either contribute the same voxel or two different voxels depending on the local shape of the surface of the object.

Subsequent to the evaluation at block 410, there will be fewer voxels left. Accordingly, histogram peaks are typically more pronounced and noise can be removed more effectively. This can be seen in the example histograms 1000A and 1000B of FIGS. 10A and 10B respectively. According to one or more embodiments described herein, in case the segment filtering (and, in some examples, the gradient thresholding) have not filtered out noise completely (or to a desired degree), a second application of gradient thresholding can be applied. Since there are fewer voxels remaining after the evaluation of the segments (block 410), histogram peaks are typically more pronounced, and noise can be removed more effectively using the second application of gradient thresholding. The second application of gradient thresholding is applied similarly to the first application of gradient thresholding described herein with reference to FIGS. 8 and 9.

Once surface voxels are identified (i.e., as having a surface passing therethrough), a position of a surface point within each surface voxel can be determined. For example, at block 412, the processing system 300 determines a position of a surface point within a surface voxel. This is referred to as subvoxel-accurate surface point determination. The resolution of a 3D voxel data set is typically given by the voxel size. However, the actual position of the surface point within an identified surface voxel (from block 410) can be identified as follows.

The gray value of a surface voxel is in between the gray value of the background and the gray value of the material. The higher the surface voxel's gray value, the closer the surface point is to the material side of the voxel. Conversely, the lower the surface voxel's gray value, the closer the surface point is to the background side of the voxel. The system 300 can calculate percentages of voxel volume that should be part of the background and part of the material as follows:

Background:$(GV_{mat}-GV_{vox})/(GV_{mat}-GV_{bg})$

Figure 11:
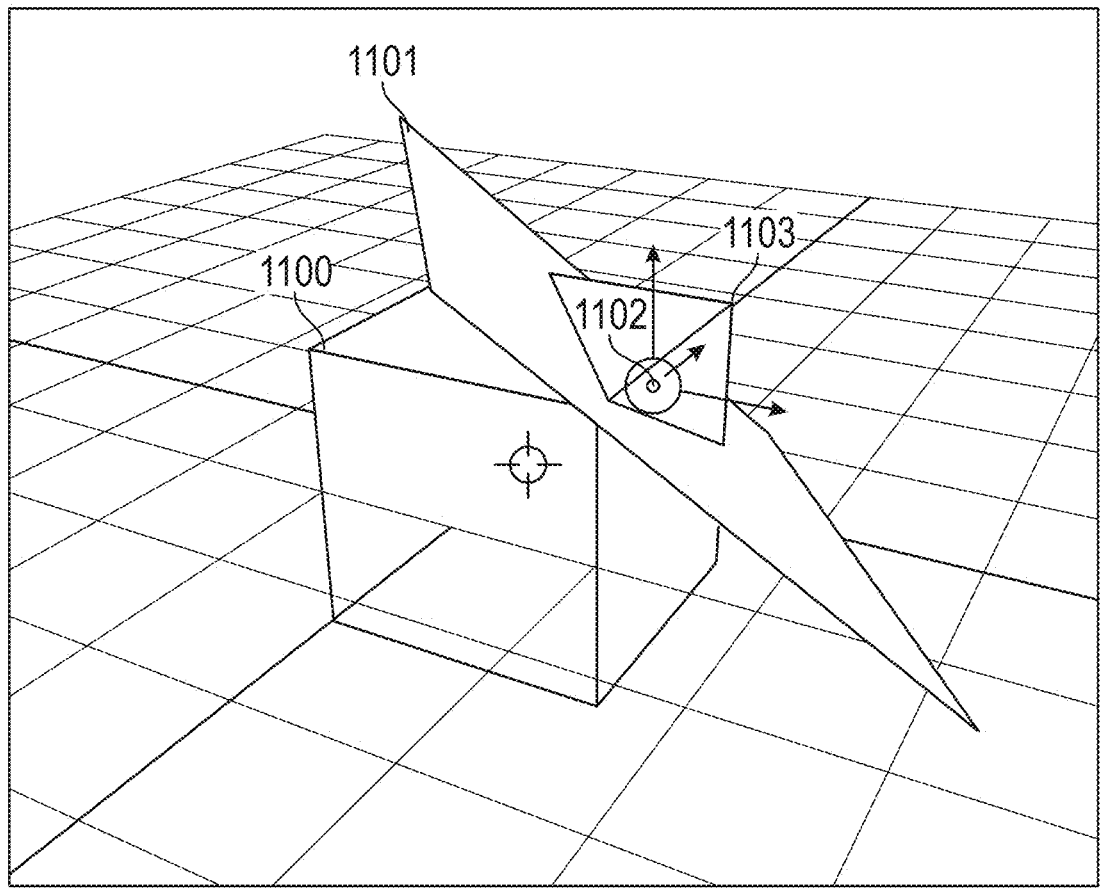
FIG. 11 depicts a surface voxel having a plane passing through a point of the surface voxel according to one or more embodiments described herein.

Material:$(GV_{vox}-GV_{bg})/(GV_{mat}-GV_{bg})$ where $GV_{vox}$ is the gray value of the surface voxel, $GV_{bg}$ is the gray value of the background, and $GV_{mat}$ is the gray value of the material. The direction of the surface voxel gradient can also be determined. The surface voxel's gradient points in the direction of the material in the opposite direction of the surface normal. Thus, the surface within each surface voxel is approximated by a plane that is perpendicular to the voxel's gradient that interests the voxel. This is shown, for example, in FIG. 11, which depicts a surface voxel 1100 having a plane 1101 passing through a point 1102 of the surface voxel 1100 according to one or more embodiments described herein. The plane 1101 is perpendicular to the gradient/surface normal cutting through the voxel 1100.

Figure 12:
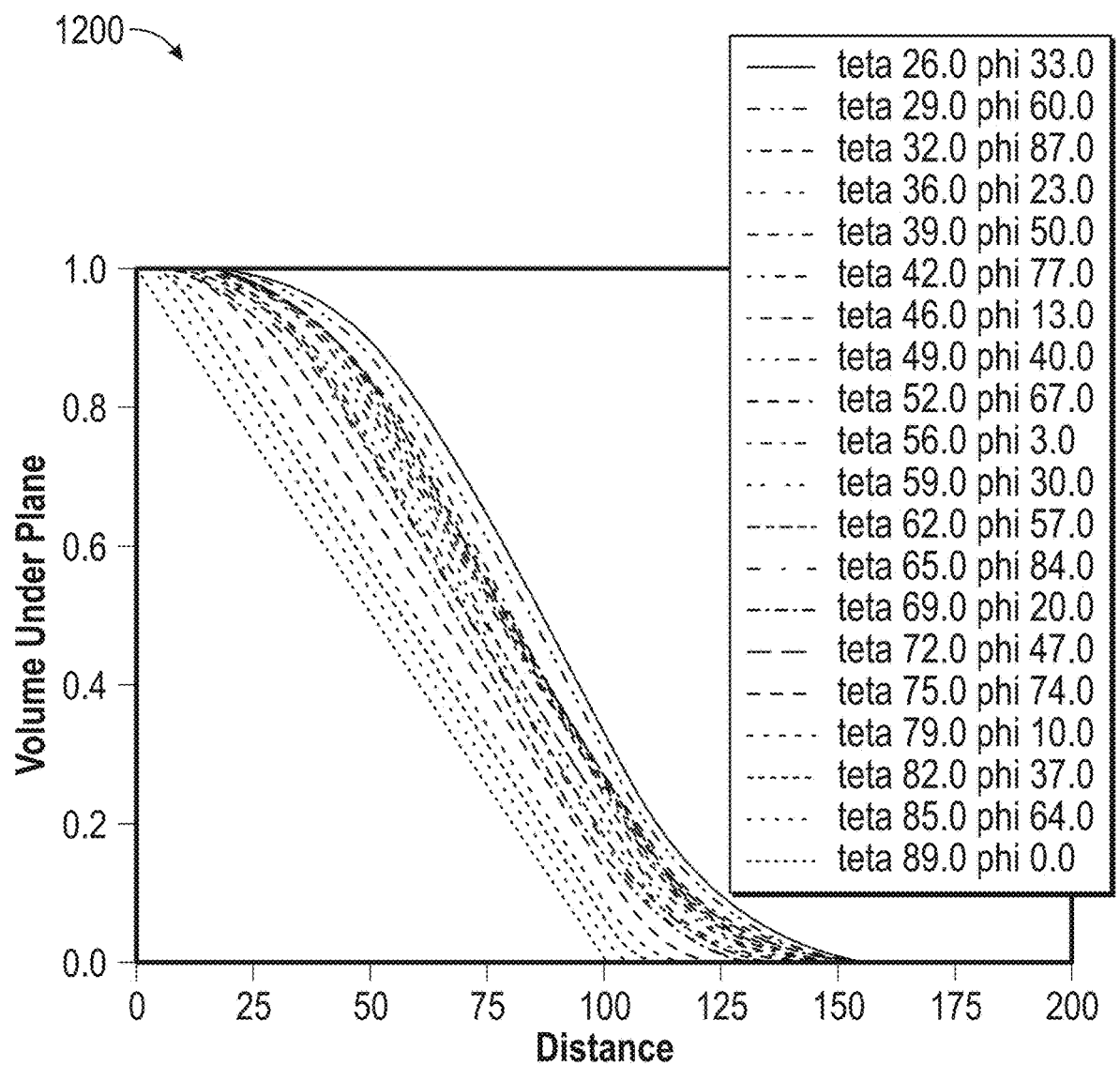
FIG. 12 depicts a graph of the distance between the plane of FIG. 11 and a corner of the voxel of FIG. 11 versus the volume under the plane of FIG. 11 according to one or more embodiments described herein.

A database can be created by calculating the volume under the plane 1101 as a function of the plane direction represented by theta ($\theta$) and phi ($\varphi$) of spherical coordinates of voxel gradient and the distance between the plane 1101 and a corner of the voxel 1100. This is shown in FIG. 12, which depicts a graph 1200 of the distance between the plane 1101 and a corner 1103 of the voxel 1100 versus the volume under the plane 1101 according to one or more embodiments described herein. The volume under the plane 1101 in the direction of the gradient is determined by the percentage of material in the voxel. As shown in FIG. 12, combinations of theta ($\theta$) and phi ($\varphi$) are used to generate the distances versus volume plotted in the graph 1200.

To determine subvoxels, a distance is extracted from the database for a given gray value and a gradient direction of the surface voxel. A point 1102 on the plane 1101 is then located at an extracted distance from the voxel corner 1103 (see FIG. 12). One point 1102 (also referred to as a "surface point") is determined per surface voxel. In some examples, the plane 1101 is then created from the surface point and gradient vector, and the plane can be sampled for higher point cloud density to refine the location of the surface point.

Additional processes also may be included in the method 400. For example, surface points can be used to generate a mesh representation of the surface according to one or more embodiments described herein. For example, meshing can include meshing the identified surface points from multiple segments to generate a mesh representation. It should be understood that the process depicted in FIG. 4 represents an illustration and that other processes may be added or existing processes may be removed, modified, or rearranged without departing from the scope of the present disclosure.

Terms such as processor, processing device, controller, computer, digital signal processor (DSP), field-programmable gate array (FPGA), etc. are understood in this document to mean a computing device that may be located within an instrument, distributed in multiple elements throughout an instrument, or placed external to an instrument.

While embodiments of the invention have been described in detail in connection with only a limited number of embodiments, it should be readily understood that the invention is not limited to such disclosed embodiments. Rather, the embodiments of the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the embodiments of the invention are not to be seen as limited by the foregoing description but is only limited by the scope of the appended claims.

What is claimed is:

1. A method comprising:
   obtaining, by a processing device, three-dimensional (3D) voxel data;
   performing, by the processing device, gray value thresholding based at least in part on the 3D voxel data and assigning a classification value to at least one voxel of the 3D voxel data;
   defining, by the processing device, segments based on the classification value;
   filtering, by the processing device, the segments based on the classification value;
   evaluating, by the processing device, the segments to identify a surface voxel per segment;
   determining, by the processing device, a position of a surface point within the surface voxel;
   and performing the gray value thresholding comprises:
   generating a gray value histogram for the 3D voxel data;
   identifying peaks in the gray value histogram;
   identifying a first threshold and a second threshold; and
   tagging voxels based at least in part on a gray value associated with each of the voxels.

2. The method of claim 1, wherein obtaining the 3D voxel data comprises:
importing the 3D voxel data.

3. The method of claim 1, wherein obtaining the 3D voxel data comprises:
creating, by a computed tomography (CT) system, two-dimensional (2D) x-ray projection images; and
constructing, by the CT system, the 3D voxel data based at least in part on the 2D x-ray projection images.

4. The method of claim 1, further comprising:
smoothing or masking the 3D voxel data subsequent to obtaining the 3D voxel data.

5. The method of claim 1, further comprising:
performing a gradient thresholding subsequent to defining the segments.

6. The method of claim 5, wherein the gradient thresholding comprises:
calculating a gray value gradient and a gradient magnitude for each voxel with a particular classification value;
generating a gradient magnitude histogram of gradient magnitudes;
identifying peaks in the gradient magnitude;
identifying a threshold relative to one of the peaks; and
untagging any voxels having a gradient magnitude less than the threshold.

7. The method of claim 1, further comprising:
performing a gradient thresholding subsequent to evaluating the segments.

8. The method of claim 7, wherein the gradient thresholding comprises:
calculating a gray value gradient and a gradient magnitude for each voxel with a particular classification value;
generating a gradient magnitude histogram of gradient magnitudes;
identifying peaks in the gradient magnitude;
identifying a threshold relative to one of the peaks; and
untagging any voxels having a gradient magnitude less than the threshold.

9. The method of claim 1, further comprising:
meshing surface points from multiple segments to generate a mesh representation.

10. The method of claim 1, wherein identifying the peaks comprises identifying a first peak corresponding to a background gray value and identifying a second peak corresponding to a material gray value.

11. The method of claim 1, wherein identifying the peaks comprises identifying a first peak corresponding to a background gray value, identifying a second peak corresponding to a first material gray value of a first material, and identifying a third peak corresponding to a second material gray value of a second material.

12. The method of claim 1, wherein identifying the peaks is based at least in part on a first derivative and a second derivative of a curve.

13. The method of claim 1, wherein identifying the first threshold is based on a first knee point associated with the first threshold, and therein identifying the second threshold is based on a second knee point associated with the second threshold.

14. The method of claim 1, wherein the first threshold is greater than the first peak, and wherein the second threshold is less than the second peak.

15. The method of claim 1, wherein a first subset of voxels having a gray value less than the first threshold are tagged with a value of "0", wherein a second subset of voxels having a gray value greater than the first threshold and less than the second threshold are tagged with a value of "1", and wherein a third subset of voxels having a gray value greater than the second threshold are tagged with a value of "2".

16. The method of claim 15, wherein the segments are a sequence of voxels tagged with the value of "1" in any one of an x-dimension, y-dimension, or z-dimension with at least one voxel tagged with the value of "1".

17. The method of claim 1, wherein determining the position of the surface point within the surface voxel comprises:
calculating a background percentage of voxel volume; and
calculating a material percentage of voxel volume.

18. The method of claim 17, further comprising:
extracting a distance from a database for a given gray value and a gradient direction of the surface voxel;
locating the surface point on a first plane using the distance from the database relative to a corner of the surface voxel;
generating a second plane through the surface point using a gradient vector; and
sampling the second plane to refine a location of the surface point based at least in part on point cloud density.

19. A method comprising:
performing, by a computed tomography (CT) system, a CT scan of an object to generate two-dimensional (2D) x-ray projection images;
performing, by a processing system, CT reconstruction to generate three-dimensional (3D) voxel data from the 2D x-ray projection images;
smoothing or masking, by the processing system, 3D voxel data;
performing, by the processing system, gray value thresholding based at least in part on the 3D voxel data and assigning a classification value to at least one voxel of the 3D voxel data;
defining, by the processing system, segments based on the classification value;
filtering, by the processing system, the segments based on the classification value;
performing, by the processing system, a first gradient thresholding;
evaluating, by the processing system, the segments to identify a surface voxel per segment;
performing, by the processing system, a second gradient thresholding;
determining, by the processing system, a position of a surface point within the surface voxel; and
meshing, by the processing system, surface points from multiple segments to generate a mesh representation.

20. The method of claim 19, wherein performing the CT scan comprises:
emitting, by an x-ray source, x-rays towards the object;
capturing, by a detector, the x-rays, wherein at least one of the x-rays passes through the object prior to being captured; and
generating, based at least in part on the captured x-rays, the 2D x-ray projection images.

21. The method of claim 19, wherein performing the first gradient thresholding comprises:
calculating a gray value gradient and a gradient magnitude for each voxel with a particular classification value;
generating a gradient magnitude histogram of gradient magnitudes;

identifying peaks in the gradient magnitude;
identifying a threshold relative to one of the peaks; and
untagging any voxels having a gradient magnitude less than the threshold.

22. The method of claim 19, wherein performing the second gradient thresholding comprises:
calculating a gray value gradient and a gradient magnitude for each voxel with a particular classification value;
generating a gradient magnitude histogram of gradient magnitudes;
identifying peaks in the gradient magnitude;
identifying a threshold relative to one of the peaks; and
untagging any voxels having a gradient magnitude less than the threshold.

23. The method of claim 19, wherein performing the gray value thresholding comprises:
generating a gray value histogram for the 3D voxel data;
identifying peaks in the gray value histogram;
identifying a first threshold and a second threshold; and
tagging voxels based at least in part on a gray value associated with each of the voxels.

24. A method comprising:
obtaining, by a processing device, three-dimensional (3D) voxel data;
performing, by the processing device, gray value thresholding based at least in part on the 3D voxel data and assigning a classification value to at least one voxel of the 3D voxel data;
defining, by the processing device, segments based on the classification value;
filtering, by the processing device, the segments based on the classification value;
evaluating, by the processing device, the segments to identify a surface voxel per segment; and
determining, by the processing device, a position of a surface point within the surface voxel;
wherein determining the position of the surface point within the surface voxel comprises:
calculating a background percentage of voxel volume; and
calculating a material percentage of voxel volume;
calculating a background percentage of voxel volume;
calculating a material percentage of voxel volume;
extracting a distance from a database for a given gray value and a gradient direction of the surface voxel;
locating the surface point on a first plane using the distance from the database relative to a corner of the surface voxel;
generating a second plane through the surface point using a gradient vector; and
sampling the second plane to refine a location of the surface point based at least in part on point cloud density.

* * * * *